US012485013B2

(12) United States Patent
Liu et al.

(10) Patent No.: US 12,485,013 B2
(45) Date of Patent: Dec. 2, 2025

(54) ZONAL TRABECULA FEMORAL CONDYLAR COMPONENT CONTAINING ZIRCONIUM-NIOBIUM ALLOY ON OXIDATION LAYER AND PREPARATION METHOD THEREOF

(71) Applicant: Just Medical Devices (Tianjin) Co., Ltd., Tianjin (CN)

(72) Inventors: Lu Liu, Tianjin (CN); Chaosheng Zhao, Tianjin (CN); Fang Yin, Tianjin (CN); Hongxiu Zhou, Tianjin (CN); Nian Liu, Tianjin (CN)

(73) Assignee: Just Medical Devices (Tianjin) Co., Ltd., Tianjin (CN)

(*) Notice: Subject to any disclaimer, the term of this patent is extended or adjusted under 35 U.S.C. 154(b) by 239 days.

(21) Appl. No.: 17/783,563

(22) PCT Filed: Jun. 21, 2021

(86) PCT No.: PCT/CN2021/101291
§ 371 (c)(1),
(2) Date: Jun. 8, 2022

(87) PCT Pub. No.: WO2022/088707
PCT Pub. Date: May 5, 2022

(65) Prior Publication Data
US 2023/0248525 A1    Aug. 10, 2023

(30) Foreign Application Priority Data
Oct. 30, 2020    (CN) .................. 202011200074.1

(51) Int. Cl.
*A61F 2/30*    (2006.01)
*A61F 2/38*    (2006.01)
*C22C 16/00*    (2006.01)

(52) U.S. Cl.
CPC ........ *A61F 2/30767* (2013.01); *A61F 2/3859* (2013.01); *C22C 16/00* (2013.01);
(Continued)

(58) Field of Classification Search
CPC ............... A61F 2/30767; A61F 2/3859; A61F 2002/30011; A61F 2002/30934; B22F 3/11
See application file for complete search history.

(56) References Cited

U.S. PATENT DOCUMENTS

2003/0153979 A1    8/2003  Hughes et al.
2016/0158843 A1    6/2016  Yolton et al.

FOREIGN PATENT DOCUMENTS

CN    106623934 A         5/2017
CN    109620481 A    *    4/2019
(Continued)

OTHER PUBLICATIONS

International Search Report of PCT/CN2021/101291.
Written Opinion of PCT/CN2021/101291.

*Primary Examiner* — Christina A Johnson

(57) ABSTRACT

The present disclosure discloses a zonal trabecular femoral condylar component containing zirconium-niobium alloy with an oxidation layer and a preparation method thereof. The preparation method is as follows: using zirconium-niobium alloy powder as a raw material, conducting a 3D printing for one-piece molding, and obtaining intermediate products of the zonal trabecular femoral condylar component containing zirconium-niobium alloy with the oxidation layer, after Sinter-HIP, cryogenic cooling and surface oxidation, the zonal trabecular femoral condylar component containing zirconium-niobium alloy with the oxidation layer is prepared. Partial of the zonal trabecular femoral condylar (Continued)

component containing zirconium-niobium alloy with the oxidation layer is provided with Zonal trabecula.

14 Claims, 11 Drawing Sheets

(52) U.S. Cl.
CPC ............... *A61F 2002/30011* (2013.01); *A61F 2002/30955* (2013.01)

(56) References Cited

FOREIGN PATENT DOCUMENTS

| | | | |
|---|---|---|---|
| CN | 109807320 | A | 5/2019 |
| CN | 110039057 | A | 7/2019 |
| CN | 110773735 | A | 2/2020 |
| CN | 110882092 | A | 3/2020 |
| CN | 112294499 | A | 2/2021 |

\* cited by examiner

ZONAL TRABECULA FEMORAL CONDYLAR COMPONENT CONTAINING ZIRCONIUM-NIOBIUM ALLOY ON OXIDATION LAYER AND PREPARATION METHOD THEREOF

CROSS-REFERENCE TO RELATED APPLICATIONS

This Application is a national stage application of PCT/CN2021/101291. This application claims priorities from PCT Application No. PCT/CN2021/101291, filed Jun. 21, 2021, and from the Chinese patent application 202011200074.1 filed Oct. 30, 2020, the content of which are incorporated herein in the entirety by reference.

TECHNICAL FIELD

The present disclosure relates to the technical field of medical implant materials, especially the zonal trabecular femoral condylar component containing zirconium-niobium alloy on oxidation layer and preparation method thereof.

BACKGROUND TECHNOLOGY

Total knee arthroplasty is currently an effective clinical treatment for end-stage knee disease. It can relieve the pain of patients, restore their knee function, and improve their quality of life by replacing the injured knee tissue with artificially designed prosthesis. Corresponding to the anatomical structure of human body, the knee prosthesis consists of femoral condylar component, tibial tray and bearing. With the rapid development of medical device technology and the continuous improvement of the requirements for the safety and effectiveness of prosthesis products, the design and manufacturing technology of knee prosthesis will require continuous optimization and improvement.

At present, the clinically used knee prostheses include two following types: cemented and cementless. Wherein, the cemented prosthesis mechanically fixes the joint prosthesis and bone tissue through the solidification and filling of bone cement. However, many years of clinical applications have found that bone cement fixation can bring many safety and effectiveness issues, such as, the heat released by the polymerization of cement monomer will cause damage to surrounding tissues; cement particles may enter the bloodstream, or cement may cause high pressure in the medullary cavity during filling, which can lead to pulmonary embolism and fat embolism.

Cementless knee prosthesis can effectively eliminate the safety and effectiveness risks caused by bone cement. It can use surface porous structures to promote bone ingrowth and obtain long-term stability. However, the porous structure of the surface is usually made by sandblasting, coating, sintering or other surface treatments, which has low bonding strength with the matrix, is easy to fall off, and reduces the service life of the prosthesis. Furthermore, according to Wolff's Law, bone deformation (also known as micro-strain) caused by stress can activate the original signal to regulate bone synthesis and catabolism and the bone growth can only be promoted when the strain range is between the minimum effective strain threshold and the super-physiological strain threshold. Therefore, it is of great significance to design a knee femoral condylar component to achieve the micro-strain in most areas of bone tissue between the minimum effective strain threshold and the super-physiological strain threshold, which is of great significance in bone ingrowth.

Zirconium-niobium alloy has been gradually used in the field of medical devices for its excellent corrosion resistance, mechanical properties and good biocompatibility. Zirconium-niobium alloy can react with N, C, O or other elements to form a hard ceramic layer on the surface. It has excellent wear resistance and low wear rate, which can reduce the wear of soft materials, that is, it has excellent wear resistance of joint articular surface. Moreover, the ceramic layer can reduce the release of metal ions and has excellent biocompatibility, that is, excellent biocompatibility at the osseointegration interface. The low wear rate of the articular surface is combined organically with the osseointegration interface (trabecula), which has excellent bone ingrowth performance, enabling the prosthesis to achieve the advantages of both interfaces at the same time. However, the existing technology fails to achieve this optimized design simultaneously.

3D printing technology, as an additive manufacturing technology, breaks through the manufacturing process-oriented product design concepts, and realizes the performance-oriented product design concept, that is, to solve the problem of complex parts that are difficult to form as a whole, and to reduce the waste of raw materials and energy caused by machining and manufacturing. However, the 3D printing products are prone to problems such as uneven microstructure and internal defects, and poor mechanical properties. The failure of powder fusion in part of trabecular structure also results in poor mechanical properties. Therefore, it is of great significance to prepare zonal trabecular femoral condylar component containing zirconium-niobium alloy on oxidation layer oxidation layer with excellent mechanical properties and the advantages of two interfaces.

SUMMARY OF THE DISCLOSURE

One of the objectives of the present disclosure is to overcome the deficiencies of the existing technology to provide zonal trabecular femoral condylar component containing zirconium-niobium alloy on oxidation layer.

The second objective of the present disclosure is to provide a preparation method of the zonal trabecular femoral condylar component containing zirconium-niobium alloy on oxidation layer.

The technical scheme of the present disclosure is outlined as follows:

The preparation method of the zonal trabecular femoral condylar component containing zirconium-niobium alloy on oxidation layer includes the following steps:

1) Using zirconium-niobium alloy powder as a raw material, conducting a 3D printing for one-piece molding, and obtaining a first intermediate product of the zonal trabecular femoral condylar component containing zirconium-niobium alloy on oxidation layer, putting the first intermediate product into a Sinter-HIP furnace, heating to 1250° C.-1400° C. under inert gas protection, and placing at a constant pressure of 140 MPa-180 MPa for 1 h to 3 h, and reducing to a normal pressure, cooling to below 200° C. with the furnace, taking it out, and obtaining a second intermediate product;

2) Putting the second intermediate product into a programmed thermostat, cooling to −80° C.~−120° C. at a rate of 1° C./min, keeping it at a constant temperature for 5 h to 10 h, and taking it out of the programmed thermostat; and putting it into a liquid nitrogen for 16 h to 36 h, and adjusting the temperature to a room temperature so as to obtain a third intermediate product;

3) Putting the third intermediate product in a programmed thermostat, cooling to −80° C.~−120° C. at a rate of 1° C./min, and placing it at a constant temperature for 5 h to 10 h, taking it out of the programmed thermostat, and putting it into the liquid nitrogen for 16 h to 36 h, and adjusting the temperature to room temperature so as to obtain a fourth intermediate product.

4) Machining, finishing, polishing, cleaning, and drying the fourth intermediate product, and obtaining a fifth intermediate product, where articular surface roughness of the fifth intermediate product is Ra≤0.050 μm.

5) Putting the fifth intermediate product into a tube furnace, introducing the normal-pressure inert gas containing 5% to 15% of oxygen in percentage by mass, heating to 500° C. to 700° C. at 5° C./min to 20° C./min, and cooling to 400° C. to 495° C. at 0.4° C./min to 0.9° C./min, and cooling to be below 200° C. sequentially, take it out to obtain the zonal trabecular femoral condylar component containing zirconium-niobium alloy on oxidation layer.

For the zonal trabecular femoral condylar component containing zirconium-niobium alloy on oxidation layer, its structure is the same as its first intermediate product, second intermediate product, third intermediate product, fourth intermediate product, and fifth intermediate product; and the inert gas is helium or argon.

The structure of the zonal trabecular femoral condylar component containing zirconium-niobium alloy on oxidation layer includes a medial condyle 11 and a lateral condyle 12 which are arranged in the left and right direction; a medial condyle anterior end 1101 of the medial condyle 11 is integrated with a lateral condyle anterior end 1102 of the lateral condyle 12; a posterior end of the medial condyle 11 is connected with a posterior end of the lateral condyle 12 by a stopper 15; a lateral wall of the medial condyle 11 and a lateral wall of the lateral condyle 12 are both provided with a holding slot 16; the medial condyle 11 is provided with a medial condyle fixation surface 110; the lateral condyle is provided with a lateral condyle fixation surface 120; the medial condyle fixation surface 110 includes a first fixation surface 111, a second fixation surface 112, a third fixation surfaces 113, a fourth fixation surface 114 and a fifth fixation surface 115 which are connected sequentially; the lateral condyle fixation surface 120 includes a sixth fixation surface 121, a seventh fixation surface 122, an eighth fixation surface 123, a ninth fixation surface 124, and a tenth fixation surface 125 which are connected sequentially; a mounting hole 17 is formed in the middle of the third fixation surface 113 and the eighth fixation surface 123; the first fixation surface 111 is intersected with the second fixation surface 112 to form a first intersecting line 181; the second fixation surface 112 is intersected with the third fixation surface 113 to form a second intersecting line 182; the third fixation surface 113 is intersected with the fourth fixation surface 114 to form a third intersecting line 183; the fourth fixation surface 114 is intersected with the fifth fixation surface 115 to form a fourth intersecting line 184; an intersecting line of the sixth fixation surface 121 and the seventh fixation surface 122 is collinear with the first intersecting line 181; an intersecting line of the seventh fixation surface 122 and the eighth fixation surface 123 is collinear with the second intersecting line 182; an intersecting line of the eighth fixation surface 123 and the ninth fixation surface 124 is collinear with the third intersecting line 183; an intersecting line of the ninth fixation surface 124 and the tenth fixation surface 125 is collinear with the fourth intersecting line 184; and the first Intersecting line 181, the second intersecting line 182, the third intersecting line 183, and fourth intersecting line 184 are parallel to each other;

An included angle between the first fixation surface 111 and the second fixation surface 112 is 130° to 140°, equal to an included angle between the sixth fixation surface 121 and the seventh fixation surface 122; an included angle between the second fixation surface 112 and the third fixation surface 113 is 130° to 140°, equal to the angle between the seventh fixation surface 122 and the eighth fixation surface 123; an included angle between the third fixation surface 113 and the fourth fixation surface 114 is 130° to 140°, equal to the angle between the eighth fixation surface 123 and the ninth fixation surface 124; an included angle between the fourth fixation surface 114 and the fifth fixation surface 115 is 130° to 140°, equal to the angle between the ninth fixation surface 124 and the tenth fixation surface 125.

The first fixation surface 111, the fifth fixation surface 115, the sixth fixation surface 121 and the tenth fixation surface 125 are provided with a first bone trabecula 191.

The second fixation surface 112, the fourth fixation surface 114, the seventh fixation surface 122 and the ninth fixation surface 124 are provided with a second bone trabecula 192.

The third fixation surface 113 and the eighth fixation surface 123 are provided with a third bone trabecula 193.

A pore diameter and porosity of the first bone trabecula 191 are smaller than those of the second bone trabecula 192 and the third bone trabecula 193 in sequence.

The chemical composition of the zirconium-niobium alloy powder in percentage by mass is respectively 85.6%-96.5% of Zr, 1.0%-12.5% of Nb, and the rest are unavoidable impurities; where a particle size of the zirconium-niobium alloy powder ranges from 45 to 150 μm.

The specific steps for adjusting the temperature in steps 2) and 3) are: increasing the temperature to −120° C. to −80° C. and keeping the constant temperature for 3 h to 5 h; then increasing the temperature to −40° C. to −20° C. and keeping the constant temperature for 3 h to 5 h; then increasing the temperature to 4° C. to 8° C. and keeping the constant temperature for 1 h to 3 h and then increasing the temperature.

The pore diameter of the first bone trabecula 191 ranges from 0.74 mm to 0.85 mm, the porosity ranges from 70.0% to 74.7%, and the through-hole ratio of 100%.

The pore diameter of the second bone trabecula 192 ranges from 0.86 mm to 0.99 mm, a porosity ranges from 74.8% to 77.5%, and a through-hole ratio of 100%.

The pore diameter of the third bone trabecula 193 ranges from 1.00 mm to 1.10 mm, a porosity ranges from 77.6% to 85%, and a through-hole ratio of 100%.

A rectangular first solid structure 21 is provided at a junction of the second fixation surface and the seventh fixation surface; a semicircular second solid structure 20 is provided at a junction of the first fixation surface and the sixth fixation surface; the thickness of the first solid structure 21 and the second solid structure 20 is equal to the thickness of the bone trabecula, ranging from 0.5 mm to 3 mm.

A side wall 22 is provided on an edge of a fixation surface formed by the medial condyle fixation surface 110, the lateral condyle fixation surface 120 and the stopper 15.

The zonal trabecular femoral condylar component containing zirconium-niobium alloy on oxidation layer is prepared in the above method.

Compared with the prior art, the present disclosure has the following beneficial effects:

The zonal trabecular femoral condylar component containing zirconium-niobium alloy on oxidation layer in the present disclosure achieves that the micro-strain in most areas of the bone tissue on the femoral condylar component is between the minimum effective strain threshold and the super-physiological strain threshold, which is conducive to bone ingrowth, thereby improving long-term stability.

Using integral 3D printing technology, the present disclosure solves the problem that traditional machining cannot prepare a complex structure, and has high bonding strength between trabecula and the matrix, therefore it is not easy to fall off, thereby improving the service life of the prosthesis.

The zonal trabecular femoral condylar component containing zirconium-niobium alloy on oxidation layer has excellent anti-compression performance. And the compressive yield strength of the solid part is enhanced, and the plasticity is enhanced.

The zonal trabecular femoral condylar component containing zirconium-niobium alloy on oxidation layer is integrated to realize the excellent biocompatibility of the osseointegration interface, outstanding bone ingrowth, and a friction interface with super wear resistance and low wear rate. There is an oxygen-rich layer between the oxidation layer and the matrix of the zonal trabecular femoral condylar component made of zirconium-niobium alloy with oxidation layer. The oxygen-rich layer acts as a transition layer, which can improve the adhesion between the oxidation layer and the matrix, and can prevent the oxidation layer from falling off. Moreover, the hardness of the oxidation layer is high.

The zonal trabecular femoral condylar component containing zirconium-niobium alloy on oxidation layer has low artifacts, little interference to nuclear magnetic field, and can be used for nuclear magnetic field detection.

DETAILED DESCRIPTION OF THE EMBODIMENTS

Figure 1:
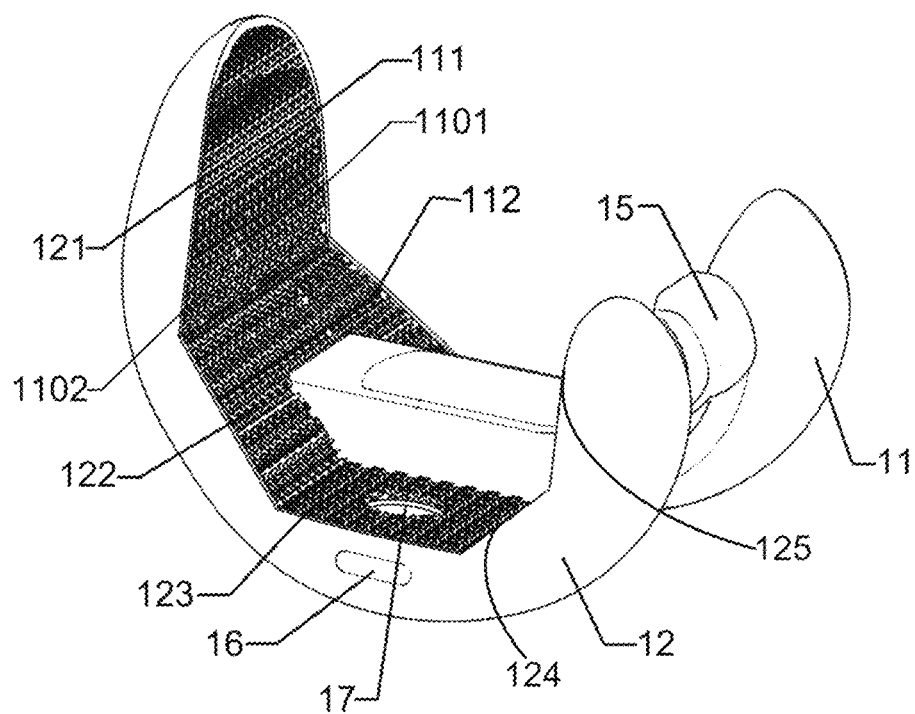
FIG. 1 shows an axonometric drawing of the zonal trabecular femoral condylar component containing zirconium-niobium alloy on oxidation layer observed from the lateral condyle.

The zonal trabecular femoral condylar component containing zirconium-niobium alloy on oxidation layer of the present disclosure is subjected to a 3D printing for one-piece molding.

The present disclosure will be further described below with the drawings and embodiments.

Embodiment 1

The preparation method of the zonal trabecular femoral condylar component containing zirconium-niobium alloy on oxidation layer includes the following steps:

1) Using zirconium-niobium alloy powder as a raw material, the first intermediate product of the zonal trabecular femoral condylar component containing zirconium-niobium alloy on oxidation layer is integrally formed by 3D printing, and the first intermediate product is put into the Sinter-HIP furnace, heated to 1250° C. under helium gas protection, and placed at a constant pressure of 180 MPa for 3 h, and the furnace is depressurized to a normal pressure, the first intermediate product is cooled to below 200° C. with the furnace and taken out to obtain a second intermediate product.

2) Place the second intermediate product in a programmed thermostat to cool to −80° C. at a rate of 1° C./min, keep it at a constant temperature for 10 h, and take it out of the programmed thermostat, and place the second intermediate product in liquid nitrogen for another 16 h, and adjust the temperature to room temperature to obtain a third intermediate product.

3) Place the third intermediate product in a programmed thermostat to cool to −80° C. at a rate of 1° C./min, and place the third intermediate product at a constant temperature for 10 h, take it out of the programmed thermostat, place it in liquid nitrogen for another 16 h and adjust the temperature to room temperature to obtain a fourth intermediate product.

The specific steps for adjusting the temperature in steps 2) and 3) are: increase the temperature to −120° C. and keep the constant temperature for 5 h, then increase the temperature to −40° C. and keep the constant temperature for 5 h, then increase the temperature to 4° C. and keep the constant temperature for 3 h and then increase the temperature.

4) The fourth intermediate product is machined, finished, polished, cleaned and dried to obtain a fifth intermediate product. The articular surface roughness of the fifth intermediate product is Ra=0.012 μm.

5) Place the fifth intermediate product in a tube furnace, introduce normal pressure helium gas containing 5% oxygen in percentage by mass, heat it to 500° C. at 5° C./min, and cool it down to 400° C. at 0.4° C./min. Under natural cooling to below 200° C., take it out to obtain the zonal trabecular femoral condylar component containing zirconium-niobium alloy on oxidation layer.

For the zonal trabecular femoral condylar component containing zirconium-niobium alloy on oxidation layer, its structure is the same as its first intermediate product, second intermediate product, third intermediate product, fourth intermediate product, and fifth intermediate product.

The chemical composition of the zirconium-niobium alloy powder is respectively 85.6% of Zr, 12.5% of Nb by mass percentage, and the rest are unavoidable impurities. The zirconium-niobium alloy powder has a particle size of 45-150 μm and is purchased from Xi'an Sailong Metal Materials Co., Ltd.

Figure 2:
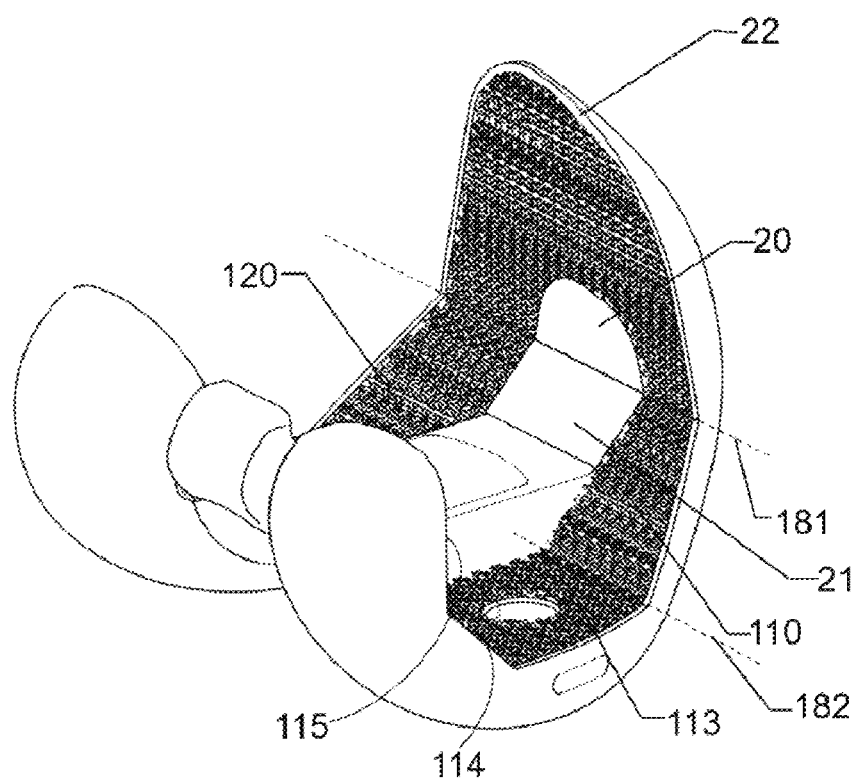
FIG. 2 shows an axonometric drawing of the zonal trabecular femoral condylar component containing zirconium-niobium alloy on oxidation layer (including the first solid structure and the second solid structure) observed from the medial condyle.
Figure 3:
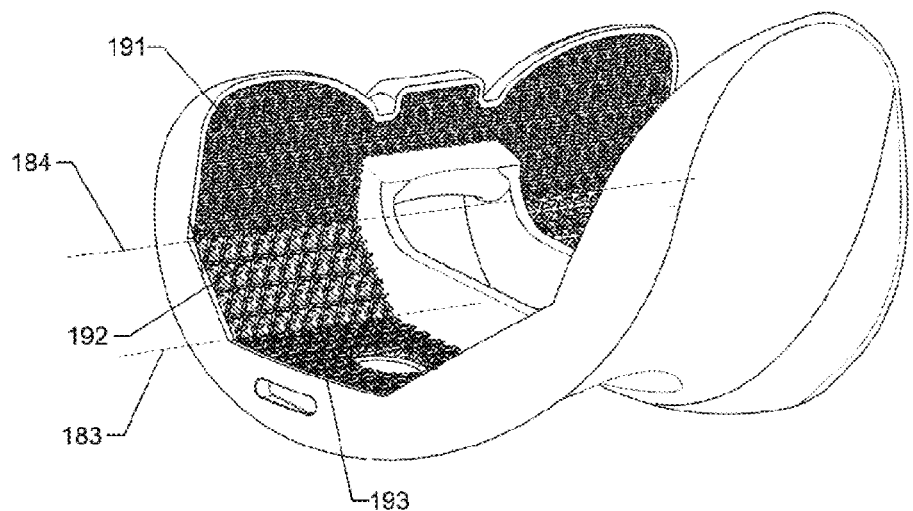
FIG. 3 shows an axonometric drawing of the zonal trabecular femoral condylar component containing zirconium-niobium alloy on oxidation layer observed from the anterior of the femoral condyle.

The structure of the above-mentioned zonal trabecular femoral condylar component containing zirconium-niobium alloy on oxidation layer (see FIGS. 1-3) includes a medial condyle 11 and a lateral condyle 12 which are arranged in a left and right direction. A medial condyle anterior end 1101 is integrated with a lateral condyle anterior end 1102; a posterior end of the medial condyle 11 is connected with a posterior end of the lateral condyle 12 by a stopper 15. The lateral wall of the medial condyle 11 and the lateral wall of the lateral condyle 12 are both provided with a holding slot 16. The medial condyle 11 is provided with a medial condyle fixation surface 110; the lateral condyle is provided with a lateral condyle fixation surface 120. The medial condyle fixation surface 110 includes a first fixation surface 111, a second fixation surface 112, a third fixation surfaces 113, a fourth fixation surface 114 and a fifth fixation surface 115 connected in sequence; the lateral condyle fixation surface 120 includes a sixth fixation surface 121, a seventh fixation surface 122, an eighth fixation surface 123, a ninth fixation surface 124, and a tenth fixation surface 125 connected in sequence. A mounting hole 17 is formed in the middle of the third fixation surface 113 and the eighth fixation surface 123. The first fixation surface 111 and the second fixation surface 112 intersect to form a first intersecting line 181; the second fixation surface 112 and the third fixation surface 113 intersect to form a second intersecting line 182; the third fixation surface 113 and the fourth fixation surface 114 intersect to form a third intersecting line 183; the fourth fixation surface 114 and the fifth fixation surface 115 form a fourth intersecting line 184; an intersecting line of the sixth fixation surface 121 and the seventh fixation surface 122 is collinear with the first intersecting line 181; an intersecting line of the seventh fixation surface 122 and the eighth fixation surface 123 is collinear with the second intersecting line 182; an intersecting line of the eighth fixation surface 123 and the ninth fixation surface 124 is collinear with the third intersecting line 183; an intersecting line of the ninth fixation surface 124 and the tenth fixation surface 125 is collinear with the fourth intersecting line 184. The first Intersecting line 181, the second intersecting line 182, the third intersecting line 183, and fourth intersecting line 184 are parallel to each other.

An included angle between the first fixation surface 111 and the second fixation surface 112 is 135°, equal to the included angle between the sixth fixation surface 121 and the seventh fixation surface 122. The included angle between the second fixation surface 112 and the third fixation surface 113 is 135°, equal to the included angle between the seventh fixation surface 122 and the eighth fixation surface 123. The included angle between the third fixation surface 113 and the fourth fixation surface 114 is 135°, equal to the included angle between the eighth fixation surface 123 and the ninth fixation surface 124. The included angle between the fourth fixation surface 114 and the fifth fixation surface 115 is 135°, equal to the included angle between the ninth fixation surface 124 and the tenth fixation surface 125.

The first fixation surface 111, the fifth fixation surface 115, the sixth fixation surface 121 and the tenth fixation surface 125 are provided with a first bone trabecula 191.

The second fixation surface 112, the fourth fixation surface 114, the seventh fixation surface 122 and the ninth fixation surface 124 are provided with a second bone trabecula 192.

The third fixation surface 113 and the eighth fixation surface 123 are provided with a third bone trabecula 193.

The pore diameter and a porosity of the first bone trabecula 191 are smaller than those of the second bone trabecula 192 and the third bone trabecula 193 in sequence.

The first bone trabecula 191 has a pore diameter of 0.80 mm, a porosity of 72%, and a through-hole ratio of 100%.

The second bone trabecula 192 has a pore diameter of 0.93 mm, a porosity of 76%, and a through-hole ratio of 100%.

The third bone trabecula 193 has a pore diameter of 1.05 mm, a porosity of 80%, and a through-hole ratio of 100%.

The thickness of the first trabecular bone 191, the second trabecular bone 192, and the third trabecular bone 193 are 1.5 mm.

It is also possible to provide a rectangular first solid structure 21 at the junction of the second fixation surface and the seventh fixation surface, and provide a semicircular second solid structure 20 at the junction of the first fixation surface and the sixth fixation surface. The thickness of the first solid structure 21 and the second solid structure 20 are equal to the thickness of the bone trabecula, which are either 1 mm or arbitrary value selected from 0.5 mm-3 mm, such as 0.5, 0.6, 0.7, 0.9, 1.1, 1.5, 2.0, 2.5 or 3 mm.

A side wall 22 is provided on the edge of the fixation surface formed by the medial condyle fixation surface 110, the lateral condyle fixation surface 120, and the stopper 15.

Embodiment 2

The preparation method of the zonal trabecular femoral condylar component containing zirconium-niobium alloy on oxidation layer includes the following steps:
1) Using zirconium-niobium alloy powder as the raw material, a 3D printing is conducted for one-piece molding, a first intermediate product of the zonal trabecular femoral condylar component containing zirconium-niobium alloy on oxidation layer is obtained, and the first intermediate product is put into the Sinter-HIP furnace, heated to 1325° C. under helium gas protection, placed at a constant pressure of 160 MPa for 2 h, and the furnace is depressurized to a normal pressure, the first intermediate product is cooled to below 200° C. with the furnace and taken out to obtain a second intermediate product.
2) Place the second intermediate product in a programmed thermostat to cool to −100° C. at a rate of 1° C./min, keep it at a constant temperature for 7 h, and take it out of the programmed thermostat, place it in liquid nitrogen for another 24 h, and adjust the temperature to room temperature to obtain a third intermediate product.
3) Place the third intermediate product in a programmed thermostat to cool to −100° C. at a rate of 1° C./min, and place it at a constant temperature for 7 h, take it out of the programmed thermostat, place it in liquid nitrogen for another 24 h and adjust the temperature to room temperature to obtain a fourth intermediate product.

The specific steps for adjusting the temperature in steps 2) and 3) are: increase the temperature to −100° C. and keep the constant temperature for 4 h, then increase the temperature to −30° C. and keep the constant temperature for 4 h, then increase the temperature to 6° C. and keep the constant temperature for 2 h and then increase the temperature.

4) The fourth intermediate product is machined, finished, polished, cleaned and dried to obtain a fifth intermediate product. The articular surface roughness of the fifth intermediate product is Ra=0.035 μm.

5) Place the fifth intermediate product in a tube furnace, introduce the normal-pressure helium gas with 10% of oxygen in percentage by mass, heat it to 600° C. at 15° C./min, and cool it down to 450° C. at 0.7° C./min. Under natural cooling to below 200° C., take it out to obtain the zonal trabecular femoral condylar component containing zirconium-niobium alloy on oxidation layer.

For the zonal trabecular femoral condylar component containing zirconium-niobium alloy on oxidation layer, its structure is the same as its first intermediate product, second intermediate product, third intermediate product, fourth intermediate product, and fifth intermediate product.

The chemical composition of the zirconium-niobium alloy powder is respectively 93.4% of Zr, 5.1% of Nb by mass percentage, and the rest are unavoidable impurities. The zirconium-niobium alloy powder has a particle size of 45-150 μm and is purchased from Xi'an Sailong Metal Materials Co., Ltd.

The structure of the zonal trabecular femoral condylar component containing zirconium-niobium alloy on oxidation layer is same as that of the structure in the Embodiment 1, with a difference as follows:

An included angle between the first fixation surface 111 and the second fixation surface 112 is 130°, equal to the included angle between the sixth fixation surface 121 and the seventh fixation surface 122. The included angle between the second fixation surface 112 and the third fixation surface 113 is 130°, equal to the included angle between the seventh fixation surface 122 and the eighth fixation surface 123. The included angle between the third fixation surface 113 and the fourth fixation surface 114 is 130°, equal to the included angle between the eighth fixation surface 123 and the ninth fixation surface 124. The included angle between the fourth fixation surface 114 and the fifth fixation surface 115 is 130°, equal to the included angle between the ninth fixation surface 124 and the tenth fixation surface 125.

The first fixation surface 111, the fifth fixation surface 115, the sixth fixation surface 121 and the tenth fixation surface 125 are provided with a first bone trabecula 191.

The second fixation surface 112, the fourth fixation surface 114, the seventh fixation surface 122 and the ninth fixation surface 124 are provided with a second bone trabecula 192.

The third fixation surface 113 and the eighth fixation surface 123 are provided with a third bone trabecula 193.

The pore diameter and a porosity of the first bone trabecula 191 are smaller than those of the second bone trabecula 192 and the third bone trabecula 193 in sequence.

The first bone trabecula 191 has a pore diameter of 0.74 mm, a porosity of 70.0%, and a through-hole ratio of 100%.

The second bone trabecula 192 has a pore diameter of 0.86 mm, a porosity of 74.8%, and a through-hole ratio of 100%.

The third bone trabecula 193 has a pore diameter of 1.00 mm, a porosity of 77.6%, and a through-hole ratio of 100%.

The thickness of the first trabecular bone 191, the second trabecular bone 192, and the third trabecular bone 193 are 0.5 mm.

Embodiment 3

The preparation method of the zonal trabecular femoral condylar component containing zirconium-niobium alloy on oxidation layer includes the following steps:

1) Using zirconium-niobium alloy powder as the raw material, a 3D printing is conducted for one-piece molding, a first intermediate product of the zonal trabecular femoral condylar component containing zirconium-niobium alloy on oxidation layer is obtained, and the first intermediate product is put into the Sinter-HIP furnace, heated to 1400° C. under argon gas protection, placed at a constant pressure of 140 MPa for 1 h, and the furnace is depressurized to a normal pressure, the first intermediate product is cooled to below 200° C. with the furnace and taken out to obtain a second intermediate product.

2) Place the second intermediate product in a programmed thermostat to cool to −120° C. at a rate of 1° C./min, keep it at a constant temperature for 5 h, and take it out of the programmed thermostat, place it in liquid nitrogen for another 36 h, and adjust the temperature to room temperature to obtain a third intermediate product.

3) Place the third intermediate product in a programmed thermostat to cool to −120° C. at a rate of 1° C./min, and place it at a constant temperature for 5 h, take it out of the programmed thermostat, place it in liquid nitrogen for another 36 h and adjust the temperature to room temperature to obtain a fourth intermediate product.

The specific steps for adjusting the temperature in steps 2) and 3) are: increase the temperature to −80° C. and keep the constant temperature for 3 h, then increase the temperature to −20° C. and keep the constant temperature for 3 h, then increase the temperature to 8° C. and keep the constant temperature for 1 h and then increase the temperature.

4) The fourth intermediate product is machined, finished, polished, cleaned and dried to obtain a fifth intermediate product. The articular surface roughness of the fifth intermediate product is Ra=0.050 μm.

5) Place the fifth intermediate product in a tube furnace, introduce the normal-pressure helium gas with 15% of oxygen in percentage by mass, heat it to 700° C. at 20° C./min, and cool it down to 495° C. at 0.9° C./min. Under natural cooling to below 200° C., take it out to obtain the zonal trabecular femoral condylar component containing zirconium-niobium alloy on oxidation layer.

For the zonal trabecular femoral condylar component containing zirconium-niobium alloy on oxidation layer, its structure is the same as its first intermediate product, second intermediate product, third intermediate product, fourth intermediate product, and fifth intermediate product.

The chemical composition of the zirconium-niobium alloy powder is respectively 96.5% of Zr, 1% of Nb by mass percentage, and the rest are unavoidable impurities. The zirconium-niobium alloy powder has a particle size of 45-150 μm and is purchased from Xi'an Sailong Metal Materials Co., Ltd.

The structure of the zonal trabecular femoral condylar component containing zirconium-niobium alloy on oxide layer is from the same as that of the structure in the Embodiment 1, with a difference as follows:

An included angle between the first fixation surface 111 and the second fixation surface 112 is 140°, equal to the included angle between the sixth fixation surface 121 and the seventh fixation surface 122. The included angle between the second fixation surface 112 and the third fixation surface 113 is 140°, equal to the included angle between the seventh fixation surface 122 and the eighth fixation surface 123. The included angle between the third fixation surface 113 and the fourth fixation surface 114 is 140°, equal to the included angle between the eighth fixation surface 123 and the ninth fixation surface 124. The included angle between the fourth fixation surface 114 and the fifth fixation surface 115 is 140°, equal to the included angle between the ninth fixation surface 124 and the tenth fixation surface 125.

The first fixation surface 111, the fifth fixation surface 115, the sixth fixation surface 121 and the tenth fixation surface 125 are provided with a first bone trabecula 191.

The second fixation surface 112, the fourth fixation surface 114, the seventh fixation surface 122 and the ninth fixation surface 124 are provided with a second bone trabecula 192.

The third fixation surface 113 and the eighth fixation surface 123 are provided with a third bone trabecula 193.

The pore diameter and porosity of the first bone trabecula 191 are smaller than those of the second bone trabecula 192 and the third bone trabecula 193 in sequence.

The first bone trabecula 191 has a pore diameter of 0.85 mm, a porosity of 74.7%, and a through-hole ratio of 100%.

The second bone trabecula 192 has a pore diameter of 0.99 mm, a porosity of 77.5%, and a through-hole ratio of 100%.

The third bone trabecula 193 has a pore diameter of 1.10 mm, a porosity of 85%, and a through-hole ratio of 100%.

The thickness of the first trabecular bone 191, the second trabecular bone 192, and the third trabecular bone 193 are 3 mm.

Control Group 1

Using zirconium-niobium alloy powder (same as Embodiment 1) as a raw material, a 3D printing is conducted for one-piece molding, a femoral condylar component with the same structure as that of Embodiment 1 is obtained.

Experiment Verification

Figure 4:
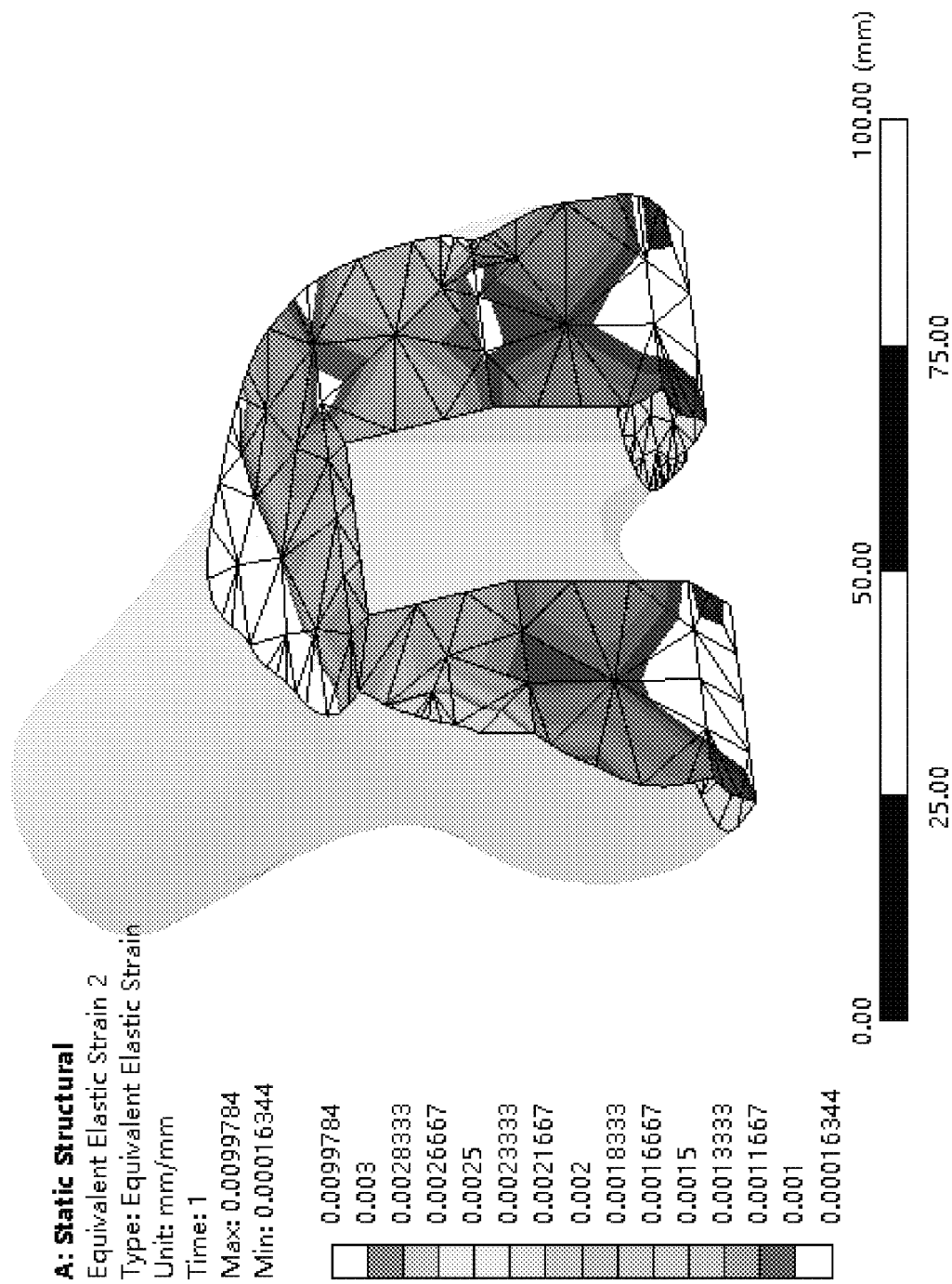
FIG. 4 shows a finite element analysis strain cloud chart of the zonal trabecular femoral condylar component containing zirconium-niobium alloy on oxidation layer observed from the anterior of the femoral condyle in Embodiment 1.
Figure 5:
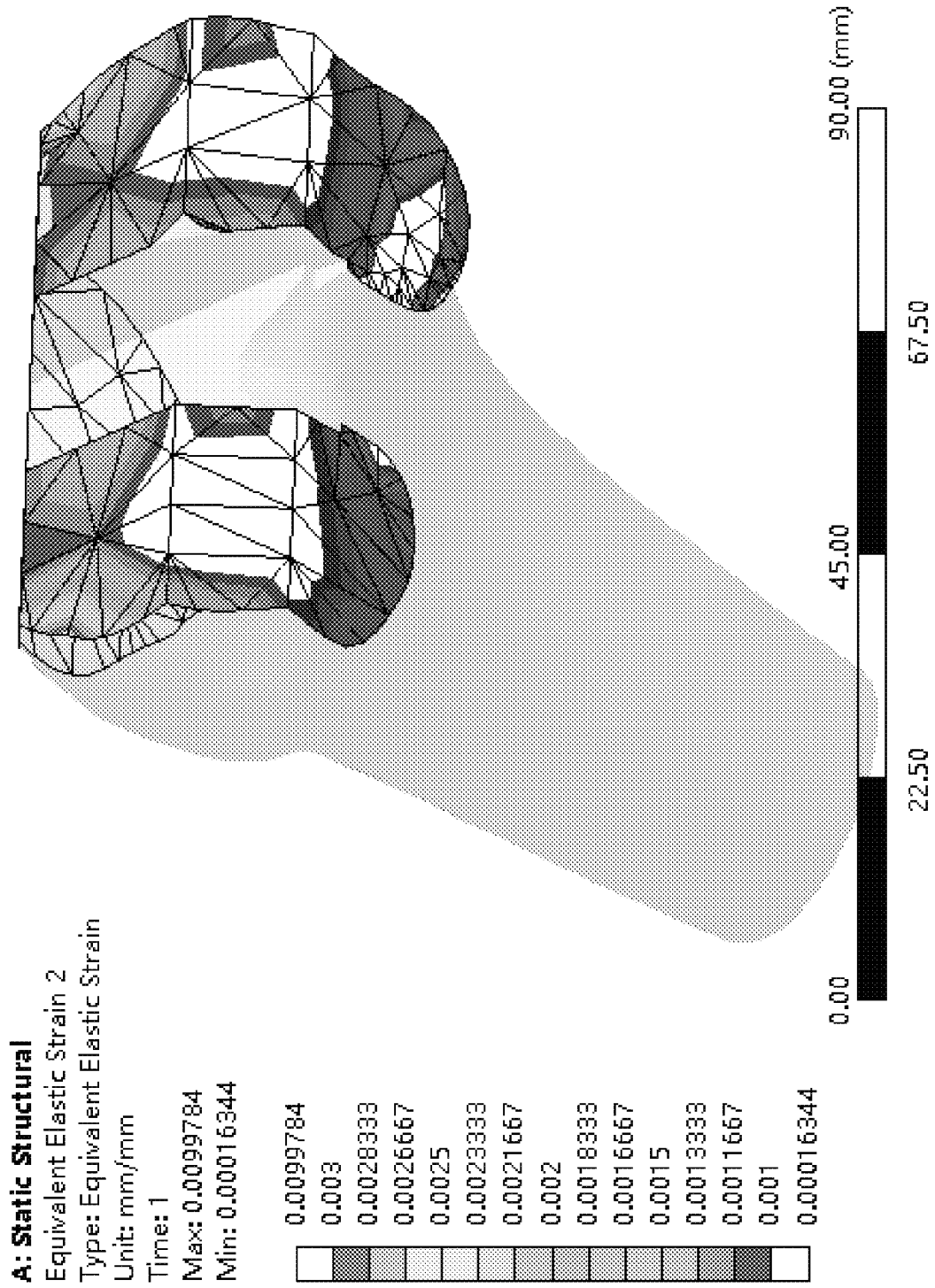
FIG. 5 shows a finite element analysis strain cloud chart of the zonal trabecular femoral condylar component containing zirconium-niobium alloy on oxidation layer observed from the posterior of the femoral condyle in Embodiment 1.

Finite element analysis on the finite element model of Embodiment 1 of the present disclosure is shown in FIGS. 4-5. The strain cloud chart only shows micro-strains (shaded areas) ranging from 1000 to 3000, and the 1000-3000 micro-strain area accounts for 65.2% of the entire femoral condylar component bone tissue finite element model. The strain cloud chart suggests that the micro-strains in most area of the zonal trabecular femoral condylar component containing zirconium-niobium alloy on oxidation layer of the present disclosure is between the minimum effective strain threshold and the super-physiological strain threshold, which allows excellent bone ingrowth performance.

Figure 6:
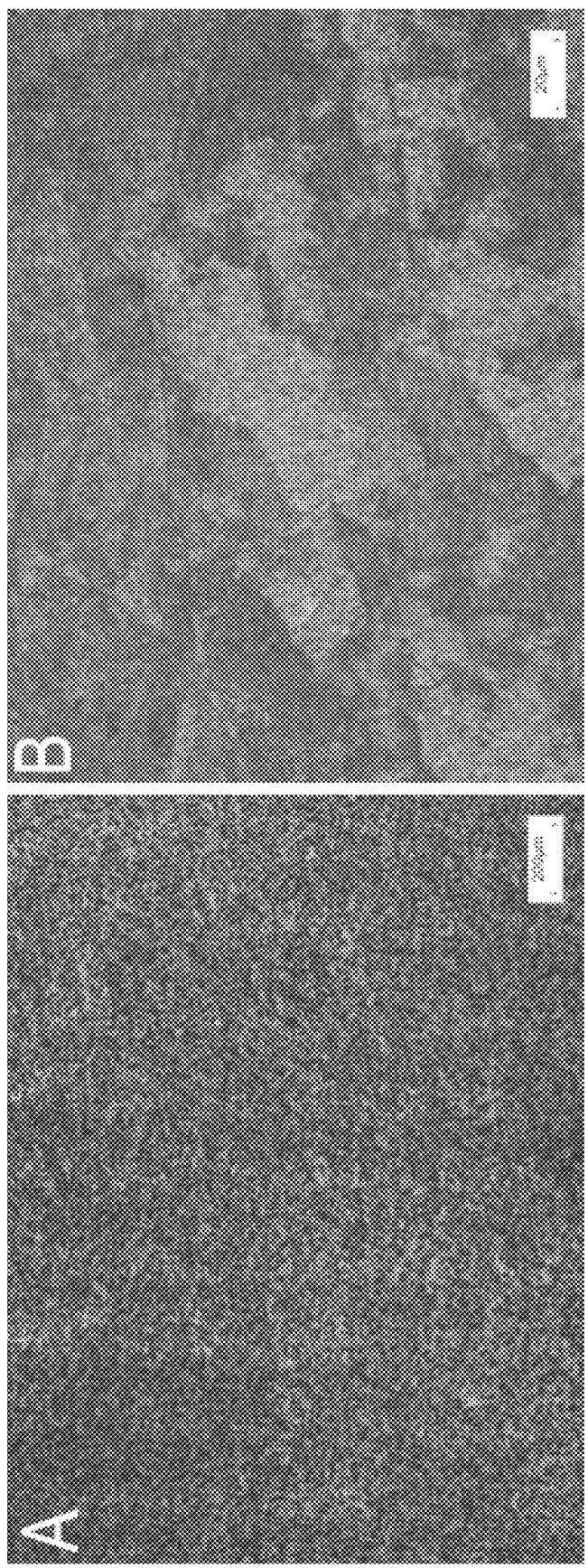
FIG. 6 shows a metallographic microstructure diagram of the solid part of Control Group 1 (A is for observation at a magnification of 50 times; B is for observation at a magnification of 500 times).
Figure 7:
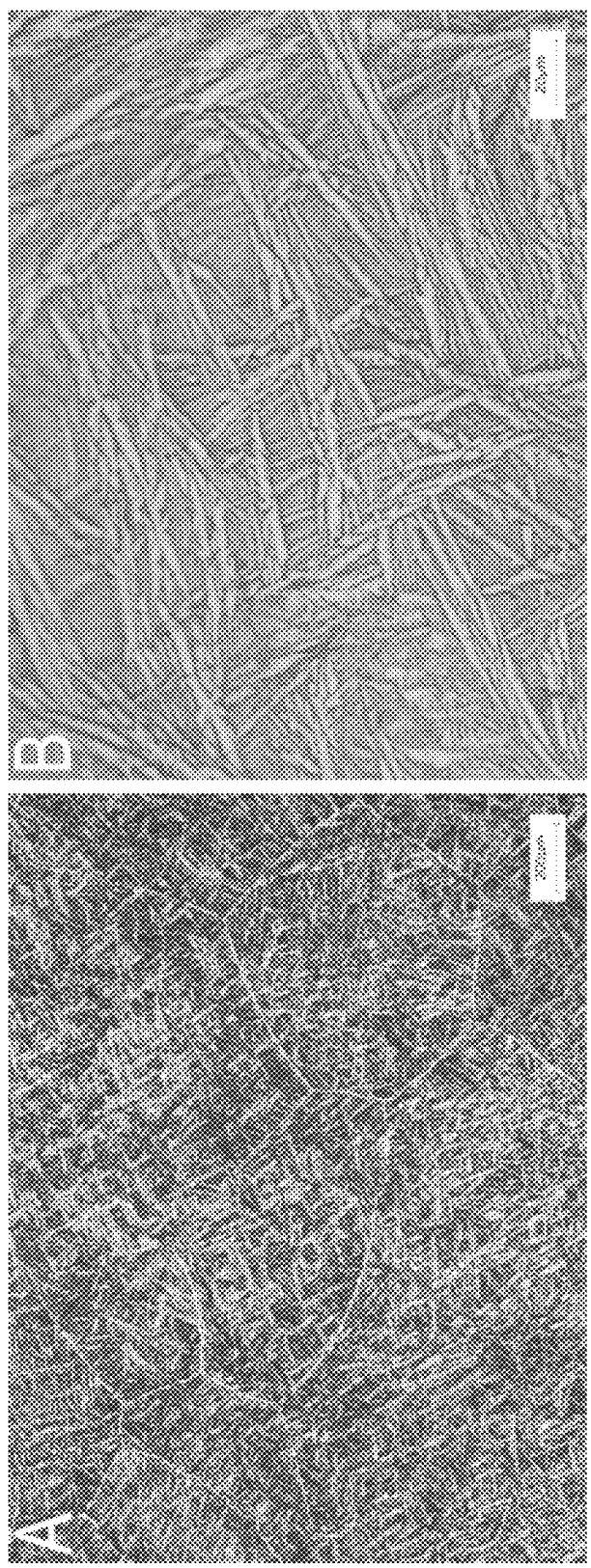
FIG. 7 shows a metallographic microstructure diagram of the solid part that has not been prepared with steps 4) and 5) of the preparation method in Embodiment 1 (A is for observation at a magnification of 50 times; B is for observation at a magnification of 500 times).

Metallographic microstructures of a solid part in the control group 1 and a solid part of the Embodiment 1 that has not been prepared with steps 4) and 5) in the preparation method were observed by an inverted universal material microscope (Axio Vert.A1, Zeiss, and Germany). As shown in FIGS. 6-7, a metallograph in the control group 1 showed a fine alpha martensite, a tissue was fine, a stress concentration was easy to cause, and a plasticity was poor; and a metallographic phase in the embodiment 1 was displayed as an alpha phase, which showed a mesh basket structure, and crystalline grains were refined. The results showed that base part of the femoral condylar component (without oxidation layer) of the present disclosure has excellent strength and plasticity.

Figure 8:
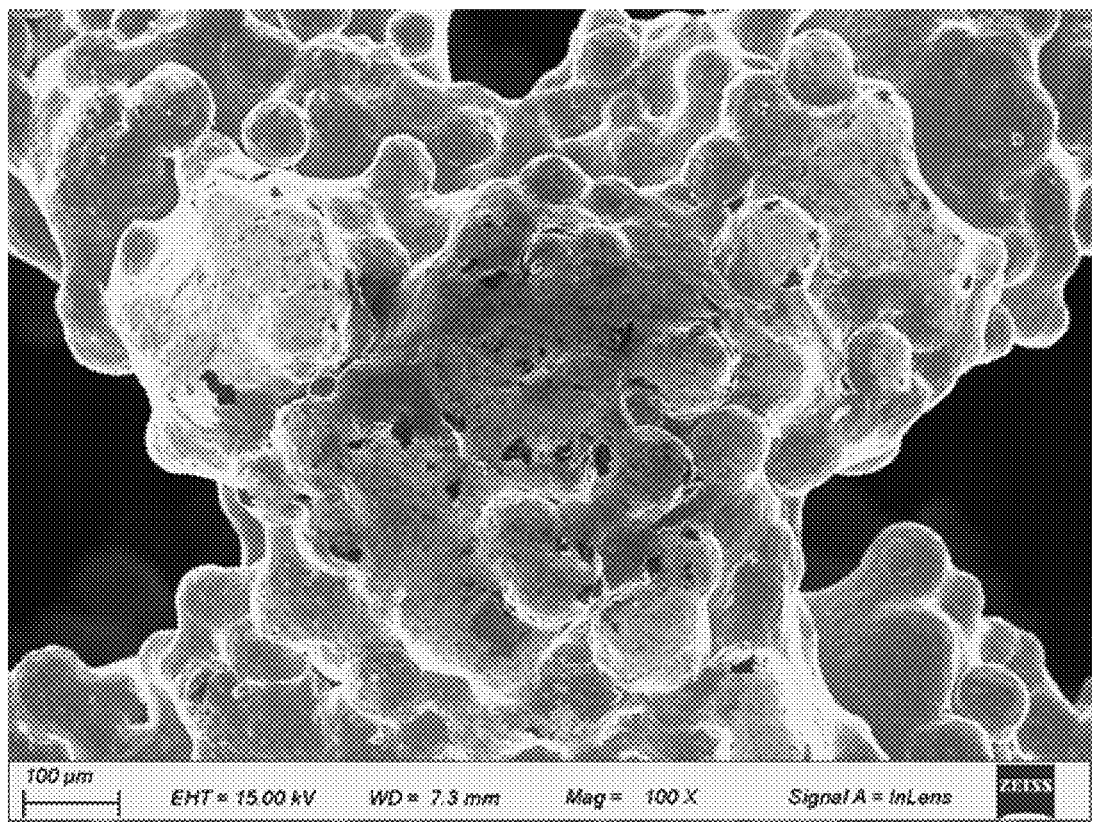
FIG. 8 shows SEM images of trabecula in Control Group 1.
Figure 9:
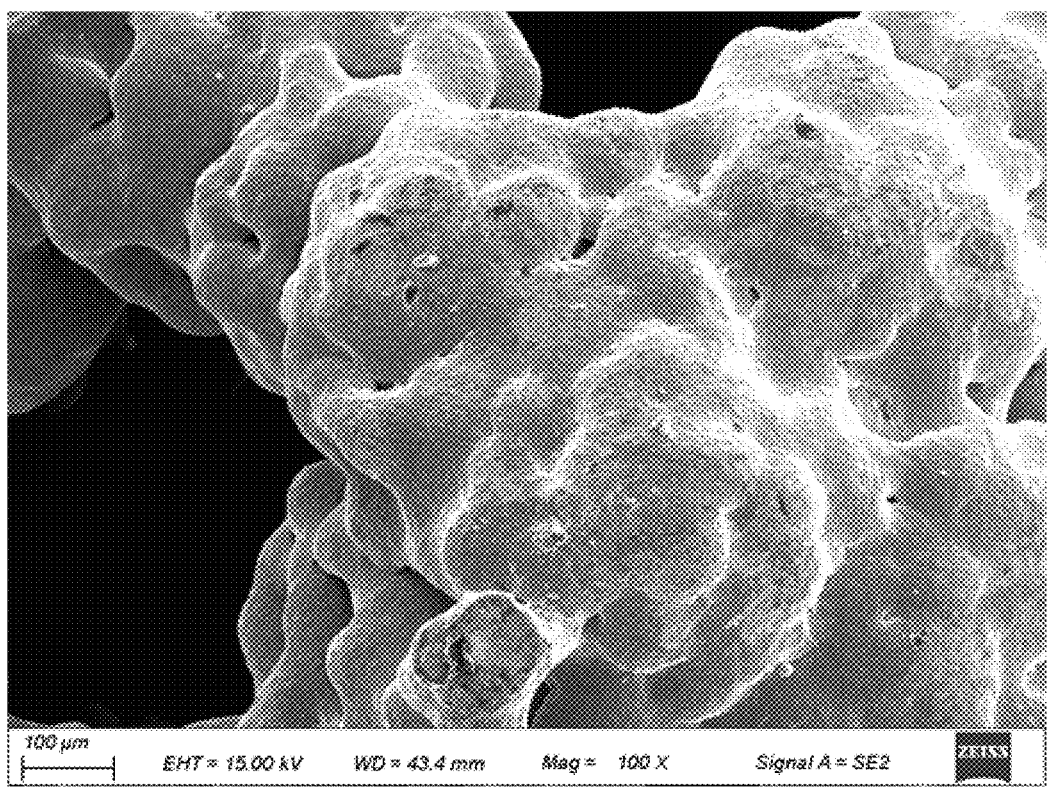
FIG. 9 shows SEM images of trabecula that has not been prepared with steps 4) and 5) of the preparation method in Embodiment 1.

A bone trabecula in the control group 1 and a bone trabecula that has not been prepared with step 4) and 5) in the preparation method in the embodiment 1 were observed and analyzed by a scanning electron microscope (Crossbeam340/550, Zeiss, and Germany), and results were shown in FIGS. 8-9. Compared with the control group 1, the zirconium-niobium alloy powder in a bone trabecular structure in the embodiment 1 was further sintered, indicating that a combination property of the bone trabecula was improved.

A physical compression test piece (size: 8*8*10 mm$^3$) that has not been prepared with step 4) and 5) in the preparation method in the embodiment 1 and a physical compression test piece (size: 8*8*10 mm$^3$) in the control group 1 were subjected to a compression performance test by an electronic universal testing machine (UTM5105, Shenzhen SUNS Technology Co., Ltd., and China). There were 5 physical compression test pieces respectively in the embodiment 1 and the control group 1. Results were shown in Table 1. The compressive yield strength of embodiment 1 is 546.72 MPa, better than that of Control Group 1 (P<0.05), suggesting that the solid part of the zonal trabecular femoral condylar component containing zirconium-niobium alloy on oxidation layer prepared by the present disclosure has excellent anti-compression performance.

TABLE 1

Anti-compression experiment results of the solid specimens of Control Group 1 and Embodiment 1 ($\bar{x} \pm$ S, n = 5, *P < 0.05, compared with Control Group 1)

| Group | Cross-sectional Area (mm$^2$) | Yield Load (kN) | Yield Strength (MPa) |
|---|---|---|---|
| Embodiment 1 | 64 | 34.99 ± 4.04* | 546.72 ± 63.19* |
| Control Group 1 | 64 | 23.59 ± 2.30 | 368.63 ± 35.92 |

A bone trabecula compression specimens with pore diameter of 0.80 mm, porosity of 72%, through-hole rate of 100% of the Control Group 1 and the bone trabecula compression specimens with pore diameter of 0.80 mm, porosity of 72%, through-hole rate of 100% of Embodiment 1 (specimen size: 8*8*10 mm$^3$) that has not been prepared with step 4) and step 5) of the above-mentioned preparation method, were subjected to a compression test by the electronic universal testing machine (UTM5105, Shenzhen SUNS Technology Co., Ltd., and China). Bone trabecula compression specimens of the Control Group 1 and the Embodiment 1 were 5 pieces each. The results are shown in Table 2. The compressive yield strength of Embodiment 1 is 18.39 MPa, significantly better than that of Control Group 1 (P<0.05), suggesting that the bone trabecula part of the zonal trabecular femoral condylar component containing zirconium-niobium alloy on oxidation layer prepared by the present disclosure has excellent anti-compression performance.

TABLE 2

Anti-compression experiment results of the bone trabecula specimens of Control Group 1 and Example 1 ($\bar{x} \pm S$, n = 5, *P < 0.05, compared with Control Group 1)

| Group | Cross-sectional Area (mm²) | Yield Load (N) | Yield Strength (MPa) |
|---|---|---|---|
| Embodiment 1 | 64 | 1177.24 ± 91.66* | 18.39 ± 1.43* |
| Control Group 1 | 64 | 926.12 ± 106.13 | 14.47 ± 1.66 |

Figure 10:
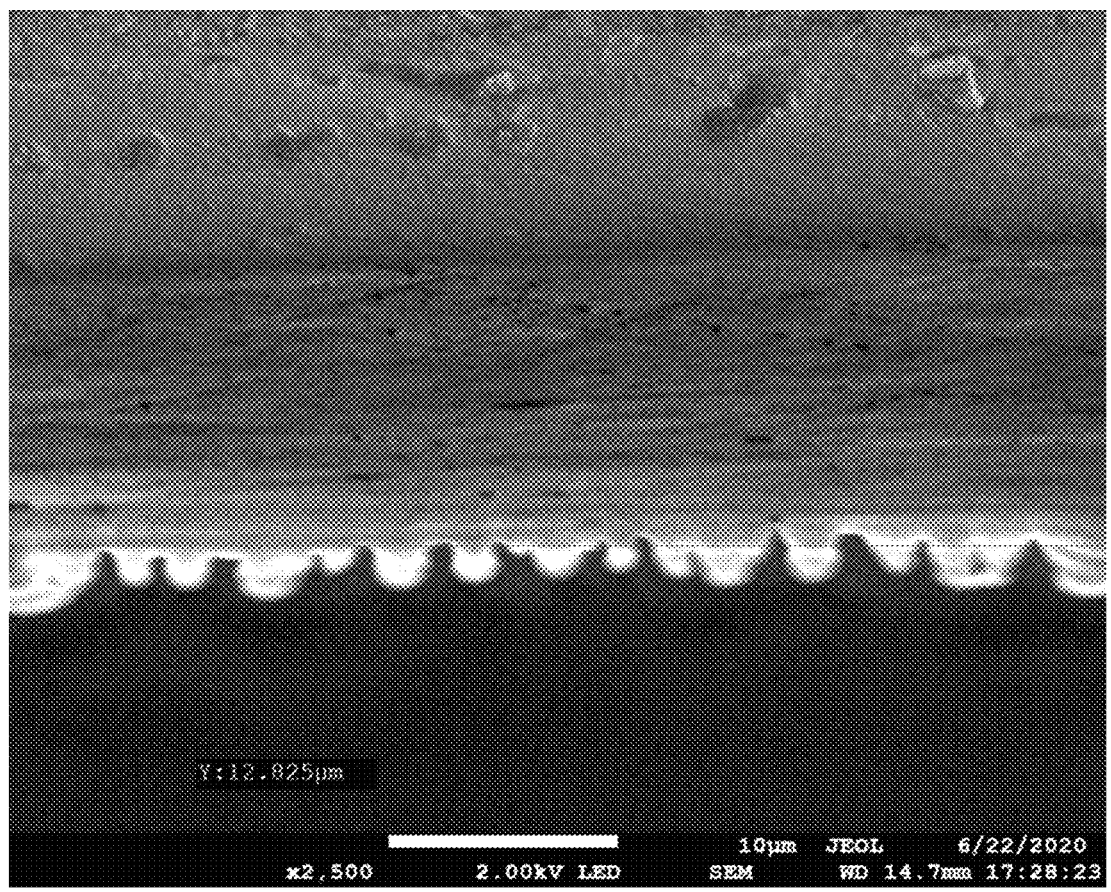
FIG. 10 shows the SEM of cross-section between the oxidation layer and the matrix in Embodiment 1.

A cross-section of the zirconium-niobium alloy base and oxidation layer of the femoral condylar component of Embodiment 1, Embodiments 2 and 3 were observed by the scanning electron microscope (Crossbeam340/550, Zeiss, and Germany) (see FIG. 10). The oxidation layer thicknesses were 10.3 μm, 17.2 μm and 20.6 μm, and an oxygen-rich layer was positioned between the oxidation layer and the zirconium-niobium metal base to enhance the bonding force between the zirconium-niobium alloy base and the oxidation layer.

Figure 11:
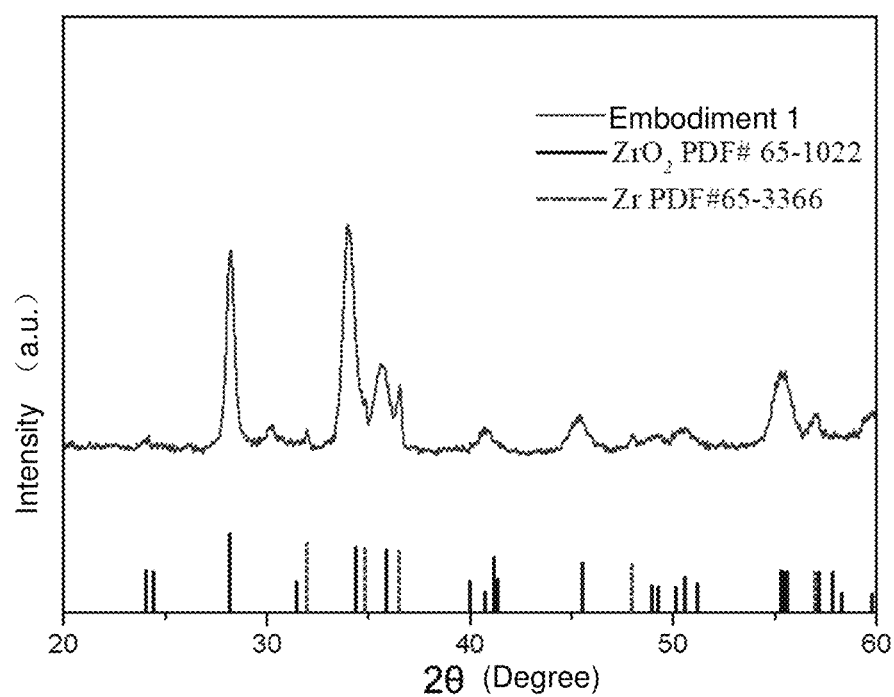
FIG. 11 shows the XRD curve of the oxidation layer surface in Embodiment 1.

XRD (D8DISCOVER, Bruker, Germany) analyzed the oxidation layer of the femoral condylar component of Embodiment 1 (see FIG. 11). The oxidation layer contained monoclinic phase zirconia and tetragonal phase zirconia.

The microhardness measurement on the zonal trabecular femoral condylar component containing zirconium-niobium alloy on oxidation layer of Embodiments 1-3 was determined by a microhardness tester (MHVS-1000 PLUS, Shanghai AolongXingdi Testing Equipment Co., Ltd., and China), in which the load was 0.05 kg, the load time of the specimens was 20s, and 8 points were taken for each specimen. The average hardness values measured in Embodiments 1-3 were 1948.6 Hv, 1923.7 Hv, and 1967.2 Hv, suggesting that the oxidation layer of the zonal trabecular femoral condylar component containing zirconium-niobium alloy on oxidation layer of the present disclosure has high hardness.

Experiments have proved that the zirconium-niobium alloy powder fusion degree, anti-compression performance, anti-compression performance of the solid part, and metallographic organization, the oxidation layer's crystal structure, thickness and hardness for the bone trabecular part of the zonal trabecular femoral condylar component containing zirconium-niobium alloy on oxidation layer prepared in Embodiments 2 and 3, are similar to that prepared in Embodiments 1.

Experiments have proved that, for the bone trabecular part of the zonal trabecular femoral condylar component containing zirconium-niobium alloy on oxidation layer prepared in Embodiments 2 and 3, its zirconium-niobium alloy powder fusion degree, anti-compression performance, anti-compression performance of the solid part, and metallographic organization, the oxidation layer's crystal structure, thickness and hardness, are similar to that prepared in Embodiments 1.

What is claimed is:

1. A preparation method of a femoral condylar component containing zirconium-niobium alloy with an oxidation layer comprising includes the following steps:
   1) using zirconium-niobium alloy powder as a raw material, conducting a 3D printing for one-piece molding, and obtaining a first intermediate product of the femoral condylar component containing zirconium-niobium alloy with the oxidation layer, putting the first intermediate product into a Sinter-HIP furnace, heating to 1250° C.-1400° C. under inert gas protection, and placing at a constant pressure of 140 MPa-180 MPa for 1 h to 3 h, and reducing to an atmospheric pressure, cooling the furnace to below 200° C. with putting the first intermediate product into the furnace, taking the first intermediate product out, and obtaining a second intermediate product;
   2) putting the second intermediate product into a programmed thermostat, cooling to −80° C. to −120° C. at a rate of 1° C./min, keeping it at a constant temperature of −80° C. to −120° C. for 5 h to 10 h, and taking the second intermediate product out of the programmed thermostat; and
   putting it into a liquid nitrogen for 16 h to 36 h, and adjusting the temperature to a room temperature so as to obtain a third intermediate product;
   3) putting the third intermediate product in a programmed thermostat, cooling to −80° C. to −120° C. at a rate of 1° C./min, and placing the third intermediate product at a constant temperature of 80° C. to −120° C. for 5 h to 10 h, taking the third intermediate product out of the programmed thermostat, and putting the third intermediate product into the liquid nitrogen for 16 h to 36 h, and adjusting the temperature to the room temperature so as to obtain a fourth intermediate product;
   4) machining, finishing, polishing, cleaning, and drying the fourth intermediate product, and obtaining a fifth intermediate product, where an articular surface roughness of the fifth intermediate product is Ra≤0.050 μm;
   5) putting the fifth intermediate product into a tube furnace, introducing an atmospheric pressure inert gas containing 5% to 15% of oxygen in percentage by mass, heating to 500° C. to 700° C. at 5° C./min to 20° C./min, and cooling to 400° C. to 495° C. at 0.4° C./min to 0.9° C./min, and cooling to be below 200° C. sequentially, taking the fifth intermediate product out to obtain the femoral condylar component containing zirconium-niobium alloy with the oxidation layer;
   and the inert gas is helium or argon;
   a structure of the femoral condylar component containing zirconium-niobium alloy with the oxidation layer includes a medial condyle (11), and a lateral condyle (12); a medial condyle anterior end (1101) of the medial condyle (11) is integrated with a lateral condyle anterior end (1102) of the lateral condyle (12); a posterior end of the medial condyle (11) is connected with a posterior end of the lateral condyle (12) by a stopper (15); a lateral wall of the medial condyle (11) and a lateral wall of the lateral condyle (12) are both provided with a holding slot (16); the medial condyle (11) is provided with a medial condyle fixation surface (110); the lateral condyle is provided with a lateral condyle fixation surface (120); the medial condyle fixation surface (110) includes a first fixation surface (111), a second fixation surface (112), a third fixation surfaces (113), a fourth fixation surface (114) and a fifth fixation surface (115) which are connected sequentially; the lateral condyle fixation surface (120) includes a sixth fixation surface (121), a seventh fixation surface (122), an eighth fixation surface (123), a ninth fixation surface (124), and a tenth fixing surface (125) which are connected sequentially; a mounting hole (17) is formed in the middle of the third fixation surface (113) and the eighth fixation surface (123); the first fixation surface (111) is intersected with the second fixation surface (112) to form a first intersecting line (181);

the second fixation surface (112) is intersected with the third fixation surface (113) to form a second intersecting line (182); the third fixation surface (113) is intersected with the fourth fixation surface (114) to form a third intersecting line (183); the fourth fixation surface (114) is intersected with the fifth fixation surface (115) to form a fourth intersecting line (184); an intersecting line of the sixth fixation surface (121) and the seventh fixation surface (122) is collinear with the first intersecting line (181); an intersecting line of the seventh fixation surface (122) and the eighth fixation surface (123) is collinear with the second intersecting line (182); an intersecting line of the eighth fixation surface (123) and the ninth fixation surface (124) is collinear with the third intersecting line (183); an intersecting line of the ninth fixation surface (124) and the tenth fixation surface (125) is collinear with the fourth intersecting line (184); and the first Intersecting line (181), the second intersecting line (182), the third intersecting line (183), and fourth intersecting line (184) are parallel to each other;

an included angle between the first fixation surface (111) and the second fixation surface (112) is 130° to 140°, equal to an included angle between the sixth fixation surface (121) and the seventh fixation surface (122); an included angle between the second fixation surface (112) and the third fixation surface (113) is 130° to 140°, equal to the included angle between the seventh fixation surface (122) and the eighth fixation surface (123); an included angle between the third fixation surface (113) and the fourth fixation surface (114) is 130° to 140°, equal to the included angle between the eighth fixation surface (123) and the ninth fixation surface (124); an included angle between the fourth fixation surface (114) and the fifth fixation surface (115) is 130° to 140°, equal to the included angle between the ninth fixation surface (124) and the tenth fixation surface (125);

the first fixation surface (111), the fifth fixation surface (115), the sixth fixation surface (121) and the tenth fixation surface (125) are provided with a first bone trabecula (191);

the second fixation surface (112), the fourth fixation surface (114), the seventh fixation surface (122) and the ninth fixation surface (124) are provided with a second bone trabecula (192);

the third fixation surface (113) and the eighth fixation surface (123) are provided with a third bone trabecula (193);

a pore diameter and porosity of the first bone trabecula (191) are smaller than those of the second bone trabecula (192) and the third bone trabecula (193) in sequence.

2. The method according to claim 1, wherein the chemical composition of the zirconium-niobium alloy powder in percentage by mass is respectively 85.6%-96.5% of Zr, 1.0%-12.5% of Nb, and the rest are unavoidable impurities; where a particle size of the zirconium-niobium alloy powder ranges from 45 to 150 μm.

3. The method according to claim 1, wherein the specific steps for adjusting the temperature to the room temperature in steps 2) and 3) are: increasing the temperature to −120° C. to −80° C. and keeping the constant temperature of −120° C. to −80° C. for 3 h to 5 h; then increasing the temperature to −40° C. to −20° C. and keeping the constant temperature of −40° C. to −20° C. for 3 h to 5 h; then increasing the temperature to 4° C. to 8° C. and keeping the constant temperature of 4° C. to 8° C. for 1 h to 3 h and then increasing the temperature.

4. The method according to claim 1, wherein the pore diameter of the first bone trabecula (191) ranges from 0.74 mm to 0.85 mm, the porosity ranges from 70.0% to 74.7%, and the through-hole ratio of 100%;

the pore diameter of the second bone trabecula (192) ranges from 0.86 mm to 0.99 mm, a porosity ranges from 74.8% to 77.5%, and a through-hole ratio of 100%;

the pore diameter of the third bone trabecula (193) ranges from 1.00 mm to 1.10 mm mm, a porosity ranges from 77.6% to 85%, and a through-hole ratio of 100%.

5. The method according to claim 1, wherein a thickness of the first bone trabecula (191), the second trabecular bone (192) and the third bone trabecula (193) are 0.5 mm to 3 mm.

6. The method according to claim 1, wherein a rectangular first solid structure (21) is provided at a junction of the second fixation surface and the seventh fixation surface; a semicircular second solid structure (20) is provided at a junction of the first fixation surface and the sixth fixation surface; a thickness of the first solid structure (21) and the second solid structure (20) is equal to a thickness of the bone trabecula, ranging from 0.5 mm to 3 mm.

7. The method according to claim 1, wherein a side wall (22) is provided on an edge of a fixation surface formed by the medial condyle fixation surface (110), the lateral condyle fixation surface (120) and the stopper (15).

8. A femoral condylar component containing zirconium-niobium alloy with the oxidation layer prepared in the method according to claim 1.

9. The femoral condylar component according to claim 8, wherein the chemical composition of the zirconium-niobium alloy powder in percentage by mass is respectively 85.6%-96.5% of Zr, 1.0%-12.5% of Nb, and the rest are unavoidable impurities; where a particle size of the zirconium-niobium alloy powder ranges from 45 to 150 μm.

10. The femoral condylar component according to claim 8, wherein the specific steps for adjusting the temperature to the room temperature in steps 2) and 3) are: increasing the temperature to −120° C. to −80° C. and keeping the constant temperature of −120° C. to −80° C. for 3 h to 5 h; then increasing the temperature to −40° C. to −20° C. and keeping the constant temperature of −40° C. to −20° C. for 3 h to 5 h; then increasing the temperature to 4° C. to 8° C. and keeping the constant temperature of 4° C. to 8° C. for 1 h to 3 h and then increasing the temperature.

11. The femoral condylar component according to claim 8, wherein the pore diameter of the first bone trabecula (191) ranges from 0.74 mm to 0.85 mm, the porosity ranges from 70.0% to 74.7%, and the through-hole ratio of 100%;

the pore diameter of the second bone trabecula (192) ranges from 0.86 mm to 0.99 mm, a porosity ranges from 74.8% to 77.5%, and a through-hole ratio of 100%;

the pore diameter of the third bone trabecula (193) ranges from 1.00 mm to 1.10 mm mm, a porosity ranges from 77.6% to 85%, and a through-hole ratio of 100%.

12. The femoral condylar component according to claim 8, wherein a thickness of the first bone trabecula (191), the second trabecular bone (192) and the third bone trabecula (193) are 0.5 mm to 3 mm.

13. The femoral condylar component according to claim 8, wherein the rectangular first solid structure (21) is provided at the junction of the second fixation surface and the seventh fixation surface; a semicircular second solid structure (20) is provided at the junction of the first fixation surface and the sixth fixation surface; a thickness of the first solid structure (21) and the second solid structure (20) is equal to a thickness of the bone trabecula, ranging from 0.5 mm to 3 mm.

14. The femoral condylar component according to claim 8, wherein a side wall (22) is provided on an edge of a fixation surface formed by the medial condyle fixation surface (110), the lateral condyle fixation surface (120) and the stopper (15).

* * * * *